US010230110B2

(12) United States Patent
Wong et al.

(10) Patent No.: US 10,230,110 B2
(45) Date of Patent: Mar. 12, 2019

(54) NANO-SCALE/NANOSTRUCTURED SI COATING ON VALVE METAL SUBSTRATE FOR LIB ANODES

(71) Applicant: COMPOSITE MATERIALS TECHNOLOGY, INC., Shrewsbury, MA (US)

(72) Inventors: James Wong, Shrewsbury, MA (US); David Frost, Shrewsbury, MA (US)

(73) Assignee: COMPOSITE MATERIALS TECHNOLOGY, INC., Shrewsbury, MA (US)

( * ) Notice: Subject to any disclaimer, the term of this patent is extended or adjusted under 35 U.S.C. 154(b) by 0 days.

(21) Appl. No.: 15/694,575

(22) Filed: Sep. 1, 2017

(65) Prior Publication Data

US 2018/0062177 A1    Mar. 1, 2018

Related U.S. Application Data

(60) Provisional application No. 62/382,696, filed on Sep. 1, 2016.

(51) Int. Cl.
| | |
|---|---|
| *H01M 4/62* | (2006.01) |
| *H01M 4/36* | (2006.01) |
| *H01M 4/38* | (2006.01) |
| *H01M 4/134* | (2010.01) |
| *H01M 10/0525* | (2010.01) |
| *H01M 4/02* | (2006.01) |

(52) U.S. Cl.
CPC ............. *H01M 4/62* (2013.01); *H01M 4/134* (2013.01); *H01M 4/366* (2013.01); *H01M 4/386* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 2,299,667 A | 1/1942 | Waterman | |
| 2,277,687 A | 3/1942 | Brennan | |
| 2,278,161 A | 3/1942 | Brennan | |
| 2,310,932 A | 2/1943 | Brennan et al. | |
| 2,616,165 A | 11/1952 | Brennan | |
| 3,141,235 A | 7/1964 | Lenz | ................ 29/182 |
| 3,277,564 A | 10/1966 | Webber et al. | |

(Continued)

FOREIGN PATENT DOCUMENTS

| | | |
|---|---|---|
| EP | 3163593 | 5/2017 |
| EP | 3166117 | 5/2017 |

(Continued)

OTHER PUBLICATIONS

Office Action issued in U.S. Appl. No. 15/675,557, dated May 4, 2018 (50 pgs).

(Continued)

*Primary Examiner* — Wyatt P McConnell
(74) *Attorney, Agent, or Firm* — Hayes Soloway P.C.

(57) ABSTRACT

An improved structure of nano-scaled and nanostructured Si particles is provided for use as anode material for lithium ion batteries. The Si particles are prepared as a composite coated with MgO and metallurgically bonded over a conductive refractory valve metal support structure.

16 Claims, 6 Drawing Sheets

(56) References Cited

U.S. PATENT DOCUMENTS

| | | |
|---|---|---|
| 3,379,000 A | 4/1968 | Webber et al. |
| 3,394,213 A | 7/1968 | Roberts et al. |
| 3,418,106 A | 12/1968 | Pierret |
| 3,473,915 A | 10/1969 | Pierret |
| 3,540,114 A | 11/1970 | Peter et al. |
| 3,557,795 A | 1/1971 | Hirsch .................. 128/335.5 |
| 3,567,407 A | 3/1971 | Yoblin |
| 3,677,795 A | 7/1972 | Bokros et al. .................. 117/46 |
| 3,698,863 A | 10/1972 | Roberts et al. |
| 3,740,834 A | 6/1973 | Douglass |
| 3,742,369 A | 6/1973 | Douglass |
| 3,800,414 A | 4/1974 | Shattes et al. |
| 4,017,302 A | 4/1977 | Bates et al. |
| 4,149,277 A | 4/1979 | Bokros .................. 3/1 |
| 4,441,927 A | 4/1984 | Getz et al. |
| 4,502,884 A | 3/1985 | Fife |
| 4,534,366 A | 8/1985 | Soukup .................. 607/121 |
| 4,578,738 A | 3/1986 | Zoltan |
| 4,646,197 A | 2/1987 | Wong .................. 361/307 |
| 4,674,009 A | 6/1987 | Wong et al. |
| 4,699,763 A | 10/1987 | Sinharoy et al. .................. 419/11 |
| 4,722,756 A | 2/1988 | Hard et al. |
| 4,734,827 A | 3/1988 | Wong .................. 361/433 |
| 4,846,834 A | 7/1989 | von Recum et al. .................. 623/11 |
| 4,940,490 A | 7/1990 | Fife et al. |
| 4,945,342 A | 7/1990 | Steinemann .................. 174/113 |
| 4,983,184 A | 1/1991 | Steinemann .................. 623/66 |
| 5,030,233 A | 7/1991 | Ducheyne .................. 623/16 |
| 5,034,857 A | 7/1991 | Wong |
| 5,143,089 A | 9/1992 | Alt .................. 600/374 |
| 5,211,741 A | 5/1993 | Fife |
| 5,217,526 A | 6/1993 | Fife |
| 5,231,996 A | 8/1993 | Bardy et al. .................. 607/126 |
| 5,245,514 A | 9/1993 | Fife et al. |
| 5,282,861 A | 2/1994 | Kaplan .................. 623/16 |
| 5,284,531 A | 2/1994 | Fife |
| 5,306,462 A | 4/1994 | Fife |
| 5,324,328 A | 6/1994 | Li et al. .................. 607/129 |
| 5,448,447 A | 9/1995 | Chang et al. |
| 5,580,367 A | 12/1996 | Fife |
| 5,869,196 A | 2/1999 | Wong et al. .................. 428/613 |
| 5,894,403 A | 4/1999 | Shah et al. |
| 5,920,455 A | 7/1999 | Shah et al. |
| 5,926,362 A | 7/1999 | Muffoletto et al. |
| 6,224,985 B1 | 5/2001 | Shah et al. |
| 6,231,993 B1 | 5/2001 | Stephenson et al. |
| 6,319,459 B1 | 11/2001 | Melody et al. .................. 419/26 |
| 6,334,879 B1 | 1/2002 | Muffoletto et al. |
| 6,468,605 B2 | 10/2002 | Shah et al. |
| 6,648,903 B1 | 11/2003 | Pierson .................. 602/232 |
| 6,687,117 B2 | 2/2004 | Liu et al. |
| 6,728,579 B1 | 4/2004 | Lindgren et al. .................. 607/116 |
| 6,780,180 B1 | 8/2004 | Goble .................. 606/41 |
| 6,792,316 B2 | 9/2004 | Sass .................. 607/116 |
| 6,859,353 B2 | 2/2005 | Elliott et al. |
| 6,965,510 B1 | 11/2005 | Liu et al. |
| 6,980,865 B1 | 12/2005 | Wang et al. .................. 607/121 |
| 7,012,799 B2 | 3/2006 | Muffoletto et al. |
| 7,020,947 B2 | 4/2006 | Bradley .................. 29/515 |
| 7,072,171 B1 | 7/2006 | Muffoletto et al. |
| 7,092,242 B1 | 8/2006 | Gloss et al. |
| 7,116,547 B2 | 10/2006 | Seitz et al. |
| 7,146,709 B2 | 12/2006 | Wong .................. 29/599 |
| 7,158,837 B2 | 1/2007 | Osypka et al. .................. 607/122 |
| 7,235,096 B1 | 6/2007 | Tassel et al. .................. 623/1.15 |
| 7,271,994 B2 | 9/2007 | Stemen et al. |
| 7,280,875 B1 | 10/2007 | Chitre et al. .................. 607/122 |
| 7,286,336 B2 | 10/2007 | Liu et al. |
| 7,342,774 B2 | 3/2008 | Hossick-Schott et al. |
| 7,480,978 B1 | 1/2009 | Wong .................. 29/599 |
| 7,483,260 B2 | 1/2009 | Ziarniak et al. |
| 7,490,396 B2 | 2/2009 | Bradley .................. 29/515 |
| 7,501,579 B2 | 3/2009 | Michael et al. .................. 174/126.1 |
| 7,666,247 B2 | 2/2010 | He et al. |
| 7,667,954 B2 | 2/2010 | Lessner et al. |
| 7,679,885 B2 | 3/2010 | Mizusaki et al. |
| 7,727,372 B2 | 6/2010 | Liu et al. |
| 7,813,107 B1 | 10/2010 | Druding et al. |
| 7,837,743 B2 | 11/2010 | Gaffney et al. |
| 7,879,217 B2 | 2/2011 | Goad et al. |
| 7,983,022 B2 | 7/2011 | O'Connor et al. |
| 8,081,419 B2 | 12/2011 | Monroe et al. |
| 8,194,393 B2 | 6/2012 | Inoue et al. .................. 361/328 |
| 8,224,457 B2 | 7/2012 | Strandberg et al. .................. 607/116 |
| 8,313,621 B2 | 11/2012 | Goad et al. |
| 8,435,676 B2 | 5/2013 | Zhamu et al. |
| 8,460,286 B2 | 6/2013 | Stangenes .................. 606/41 |
| 8,673,025 B1 | 3/2014 | Wong |
| 8,858,738 B2 | 10/2014 | Wong |
| 9,155,605 B1 | 10/2015 | Wong .................. A61F 2/0063 |
| 9,312,075 B1 | 4/2016 | Liu et al. |
| 9,498,316 B1 | 11/2016 | Wong .................. 623/23.72 |
| 9,633,796 B2 | 4/2017 | Liu et al. |
| 2003/0183042 A1 | 10/2003 | Oda et al. .................. 75/245 |
| 2004/0121290 A1 | 6/2004 | Minevski et al. .................. 433/201.1 |
| 2004/0244185 A1 | 12/2004 | Wong |
| 2005/0159739 A1 | 7/2005 | Paul .................. 606/41 |
| 2006/0195188 A1 | 8/2006 | O'Driscoll et al. .................. 623/14.12 |
| 2006/0279908 A1 | 12/2006 | Omori et al. .................. 361/528 |
| 2007/0093834 A1 | 4/2007 | Stevens et al. .................. 606/69 |
| 2007/0167815 A1 | 7/2007 | Jacobsen .................. 600/459 |
| 2007/0214857 A1 | 9/2007 | Wong et al. |
| 2007/0244548 A1 | 10/2007 | Myers et al. .................. 623/1.42 |
| 2008/0072407 A1 | 3/2008 | Wong |
| 2008/0234752 A1 | 9/2008 | Dahners .................. 606/291 |
| 2009/0018643 A1 | 1/2009 | Hashi et al. .................. 623/1.15 |
| 2009/0044398 A1 | 2/2009 | Wong |
| 2009/0075863 A1 | 3/2009 | O'Driscoll et al. .................. 514/3 |
| 2009/0095130 A1 | 4/2009 | Smokovich et al. .................. 75/356 |
| 2009/0185329 A1 | 7/2009 | Breznova et al. .................. 361/529 |
| 2009/0187258 A1 | 7/2009 | Ip et al. .................. 623/23.72 |
| 2009/0228021 A1 | 9/2009 | Leung .................. 606/139 |
| 2009/0234384 A1 | 9/2009 | Hadba .................. 606/215 |
| 2010/0044076 A1 | 2/2010 | Chastain et al. .................. 174/126.2 |
| 2010/0075168 A1 | 3/2010 | Schaffer .................. 428/544 |
| 2010/0134955 A1 | 6/2010 | O'Connor et al. |
| 2010/0211147 A1 | 8/2010 | Schiefer et al. .................. 607/116 |
| 2010/0280584 A1 | 11/2010 | Johnson et al. .................. 607/116 |
| 2010/0310941 A1* | 12/2010 | Kumta .................. H01B 1/04 429/231.95 |
| 2011/0082564 A1 | 4/2011 | Liu et al. .................. 623/23.72 |
| 2011/0137419 A1 | 6/2011 | Wong .................. 623/16.11 |
| 2011/0189510 A1 | 8/2011 | Caracciolo et al. |
| 2012/0081840 A1 | 4/2012 | Matsuoka et al. .................. 361/529 |
| 2012/0094192 A1 | 4/2012 | Qu et al. |
| 2012/0239162 A1 | 9/2012 | Liu .................. 623/23.74 |
| 2013/0282088 A1 | 10/2013 | Bondhus .................. 607/116 |
| 2015/0028263 A1 | 1/2015 | Wang et al. |
| 2015/0104705 A1* | 4/2015 | Canham .................. C01B 33/023 429/218.1 |
| 2016/0225533 A1 | 8/2016 | Liu et al. |
| 2017/0125177 A1 | 5/2017 | Perez et al. |
| 2017/0125178 A1 | 5/2017 | Perez et al. |
| 2017/0148576 A1 | 5/2017 | Hahl et al. |

FOREIGN PATENT DOCUMENTS

| | | | |
|---|---|---|---|
| EP | 3171378 | 5/2017 | |
| WO | WO9828129 | 7/1998 | .................. B32B 15/00 |
| WO | WO2008039707 | 4/2008 | .................. H01G 9/00 |
| WO | WO 2008/063526 | 5/2008 | .................. B22F 1/00 |
| WO | WO2009082631 | 7/2009 | .................. H01G 9/00 |
| WO | WO2016187143 | 11/2016 | .................. H01M 4/74 |

OTHER PUBLICATIONS

Bobyn et al., "Characteristics of bone ingrowth and interface mechanics of a new porous tantalum biomaterial," The Journal of Bone & Joint Surgery (Br), Vo. 81-B, No. 5, Sep. 1999 (8 pgs).

Extended European Search Report issued in related application No. 10835252.7, dated May 12, 2014 (7 pgs).

Grifantini, K., "Nervy Repair Job," Technology Review, Jan./Feb. 2010, pp. 80-82 (3 pgs).

(56) References Cited

OTHER PUBLICATIONS

International Preliminary Report on Patentability issued in application No. PCT/US2013/060702, dated Apr. 2, 2015 (8 pgs).
International Preliminary Report on Patentability issued in application No. PCT/US2013/063915, dated Apr. 23, 2015 (7 pgs).
International Preliminary Report on Patentability issued in PCT/US2010/059124 dated Jun. 14, 2012 (6 pgs).
International Preliminary Report on Patentability, issued in application No. PCT/US2014/061385, dated May 12, 2016 (8 pgs).
International Search Report and Written Opinion issued in application PCT/US14/61385, dated Mar. 17, 2015 (11 pgs).
International Search Report and Written Opinion issued in PCT/US2010/059124, dated Feb. 15, 2011 (9 pgs).
Journal article by Yarlagadda et al. entitled "Recent Advances and Current Developments in Tissue Scaffolding" published in Bio-Medical Materials and Engineering 2005 15(3), pp. 159-177 (26 pgs).
Li et al., "Ti6Ta4Sn Alloy and Subsequent Scaffolding for Bone Tissue Engineering," Tissue Engineering: Part A, vol. 15, No. 10, 2009, pp. 3151-3159 (9 pgs).
Lu, N., "Soft, flexible electronics bond to skin and even organs for better health monitoring," Technology Review, Sep./Oct. 2012 (4 pgs).
Markaki et al., "Magneto-mechanical stimulation of bone growth in a bonded array of ferromagnetic fibres," Biomaterials 25, 2004, pp. 4805-4815 (11 pgs).
Meier et al., "Cardiologist Issues Alert on St. Jude Heart Device," The New York Times, Business Day section, Aug. 22, 2012, pp. B1-B2, (2 pgs).
Notice of Allowance issued in U.S. Appl. No. 14/857,614, dated May 26, 2016 (9 pgs).
Office Action issued in U.S. Appl. No. 14/517,312, dated Oct. 8, 2015 (8 pgs).
Office Action issued in U.S. Appl. No. 14/696,130, dated Nov. 3, 2015 (24 pgs).
Office Action issued in U.S. Appl. No. 14/707,944, dated Jan. 29, 2016 (13 pgs).
Office Action issued in U.S. Appl. No. 14/857,614, dated Dec. 3, 2015 (24 pgs).
Office Action issued in U.S. Appl. No. 14/857,614, dated Feb. 26, 2016 (15 pgs).
Office Action issued in U.S. Appl. No. 14/871,677, dated May 13, 2016 (15 pgs).
Office Action issued in related U.S. Appl. No. 12/961,209, dated Jul. 5, 2012 (12 pgs).
Office Action issued in related U.S. Appl. No. 13/713,885, dated May 10, 2013 (12 pgs).
Office Action issued in related U.S. Appl. No. 13/713,885, dated Aug. 8, 2013 (7 pgs).
Office Action issued in related U.S. Appl. No. 13/713,885, dated Oct. 30, 2013 (11 pgs).
Office Action issued in related U.S. Appl. No. 14/030,840, dated Jul. 17, 2014 (13 pgs).
Office Action issued in related U.S. Appl. No. 14/030,840, dated Apr. 9, 2014 (13 pgs).
Office Action issued in related U.S. Appl. No. 14/030,840, dated Dec. 13, 2013 (9 pgs).
Office Action issued in related U.S. Appl. No. 14/174,628, dated Jun. 10, 2014 (19 pgs).
Office Action issued in related U.S. Appl. No. 14/328,567, dated Feb. 25, 2015 (24 pgs).
Office Action issued in related U.S. Appl. No. 14/328,567, dated Apr. 1, 2015 (11 pgs).
Office Action issued in related U.S. Appl. No. 14/328,567, dated May 28, 2015 (19 pgs).
Office Action issued in related U.S. Appl. No. 14/494,940, dated Nov. 18, 2014 (14 pgs).
Office Action issued in related U.S. Appl. No. 14/517,312, dated Jun. 23, 2015 (40 pgs).
Office Action issued in related U.S. Appl. No. 14/517,312, dated May 29, 2015 (6 pgs).
PCT International Search Report and Written Opinion issued in corresponding application No. PCT/US13/60702, dated Dec. 5, 2013 (9 pgs).
Ryan et al., "Fabrication methods of porous metals for use in orthopaedic applications," Biomaterials 27, 2006, pp. 2651-2670 (20 pgs).
Wang et al., "Biomimetic Modification of Porous TiNbZr Alloy Scaffold for Bone Tissue Engineering," Tissue Engineering: Part A, vol. 00, No. 00, 2009, pp. 1-8, (8 pgs).
Wang, M., "Composite Scaffolds for Bone Tissue Engineering," American Journal of Biochemistry and Biotechnology 2 (2), 2006, pp. 80-83 (4 pgs).
U.S. Appl. No. 12/961,209, filed Dec. 6, 2010.
U.S. Appl. No. 13/713,885, filed Dec. 13, 2012.
U.S. Appl. No. 14/030,840, filed Sep. 18, 2013.
U.S. Appl. No. 14/174,628, filed Feb. 6, 2014.
U.S. Appl. No. 14/328,567, filed Jul. 10, 2014.
U.S. Appl. No. 14/494,940, filed Sep. 24, 2014.
U.S. Appl. No. 14/517,312, filed Oct. 17, 2014.
U.S. Appl. No. 14/696,130, filed Apr. 24, 2015.
U.S. Appl. No. 14/707,944, filed May 8, 2015.
U.S. Appl. No. 14/857,614, filed Sep. 17, 2015.
U.S. Appl. No. 15/675,557, filed Aug. 11, 2017.
International Search Report and Written Opinion issued in application No. PCT/US2017/046619, dated Dec. 11, 2017 (12 pgs).
Invitation to Pay Additional Fees issued in application No. PCT/US2017/046619, dated Sep. 15, 2017 (2 pgs).
Issue Fee Transmittal for U.S. Appl. No. 14/479,689, filed Feb. 29, 2016 (1 pg).
Notice of Allowance issued in U.S. Appl. No. 14/479,689, dated Dec. 1, 2015 (8 pgs).
Office Action issued in U.S. Appl. No. 14/479,689, dated Nov. 13, 2015 (7 pgs).
Office Action issued in U.S. Appl. No. 15/675,557, dated Mar. 8, 2018 (7 pgs).
PCT International Search Report for related PCT International Patent Application Serial No. PCT/US17/49950, dated Nov. 16, 2017, 9 pgs.
Petition for Inter Partes Review of U.S. Pat. No. 9,312,075, dated May 15, 2017 (138 pgs).
Tantalum capacitor description from Wikipedia, downloaded on Jul. 25, 2016 (24 pgs).

\* cited by examiner

NANO-SCALE/NANOSTRUCTURED SI COATING ON VALVE METAL SUBSTRATE FOR LIB ANODES

CROSS-REFERENCE TO RELATED APPLICATION

This application claims priority from US Provisional Application Ser. No. 62/382,696, filed Sep. 1, 2016, the contents of which are incorporated herein by reference.

FIELD OF INVENTION

The present invention relates to improvements in anode materials for use in lithium ion batteries, and will be described in connection with such utility, although other utilities are contemplated.

BACKGROUND OF THE INVENTION

Silicon is a promising material for high capacity anodes in lithium ion batteries (LIB). When alloyed with lithium, the specific capacity (mAh/g) of silicon is an order of magnitude higher than conventional graphite anode materials. However, silicon exhibits a large volume change (up to 400% expansion and contraction) during lithiation (charging) and delithiation (discharging), respectively. For bulk silicon, this creates structural stress gradients within the silicon and results in fractures and mechanical stress failure (pulverization) thereby decreasing effective electrical contact and lifetime of the silicon anode.

Considerable efforts have been undertaken to overcome this intrinsic issue by controlling the morphology and limiting the size of silicon particles to a size below which silicon is less likely to fracture, approximately 50 nm.

Various attempts to avoid the physical damage caused by silicon's expansion/contraction have included nanoscaled and nanostructured silicon in forms such as thin films; nanowires; nanotubes; nanoparticles; mesoporous materials; and nanocomposites. Most of these approaches do not provide viable, cost effective solutions.

One promising method utilizes Si—MgO composites formed by mechanical alloying/solid phase reaction of $SiO_2$ and magnesium according to the reaction:

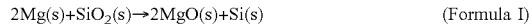

$$2Mg(s)+SiO_2(s) \rightarrow 2MgO(s)+Si(s) \qquad \text{(Formula I)}$$

The MgO matrix has shown to buffer the effects of volumetric changes; however, these composites have relatively low electrical conductivity rendering them poorly effective as anode material.

Sub-micron scale, electrochemically active particles dispersed on conductive substrates and supports have long been used for electrochemical cells including fuel cells and batteries. This support structure is an important component with regard to cell efficiency and lifetime. Valve (or refractory) metals particularly, (specifically: Titanium, Niobium, Tantalum, and their alloys) have been used as substrates for electrochemically active materials for over 70 years in application of chemical processing and cathodic protection. These applications utilize the formation of a passivating oxide film over the exposed valve metal areas, as a means of creating a conductive and electrochemically stable support structure for the active material.

Mg has long been used as a magnesiothermic reducing agent for purification of refractory metals. This process is common in production of high capacity, high surface tantalum powders for capacitor applications occurring via the vapor/solid phase reaction:

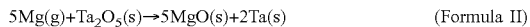

$$5Mg(g)+Ta_2O_5(s) \rightarrow 5MgO(s)+2Ta(s) \qquad \text{(Formula II)}$$

The resulting magnesium oxide forms a surface coating over the host Ta particles, and is removed using mineral acids.

In one aspect the present invention provides electrically active electrode material for use with a lithium ion cell, the electrochemically active material electrode material comprising a valve metal substrate material formed of filaments or particles of a valve metal not larger than about 10 microns in cross section, and coated with metallurgically bonded silicon particles.

In a preferred embodiment, the valve metal is selected from the group consisting of tantalum, niobium, an alloy of tantalum, an alloy of niobium, hafnium, titanium and aluminum.

In another preferred embodiment, the valve metal filaments have a thickness of less than about 5-10 microns, and preferably have a thickness below about 1 micron.

In one aspect the silicon coating is comprised of nanoscaled nanoparticles.

In another aspect the silicon particles are coated on the valve metal substrate in a stabilizing MgO matrix.

In still another aspect, electrically active electrode material as above described is formed into an anode.

The present invention also provides a method of forming an electrode substrate useful for forming a lithium ion battery comprising the steps of: (a) providing valve metal substrate material formed of filaments or particles of a valve metal not larger than about 10 microns in cross section; and, (b) coating the valve metal substrate material with metallurgically bonded silicon formed by a magnesiothermic reaction of magnesium with silica and the valve metal.

In one aspect of the method, the magnesiothermic reaction is conducted under vacuum or in an inert gas at elevated temperature, preferably an elevated temperature selected from a group consisting of 800-1200° C., 900-1100° C. and 950-1050° C.

In another aspect of the method, the magnesiothermic reaction is conducted for time selected from 2-10 hours, 4-8 hours and 5-6 hours.

In yet another aspect of the method includes the step of removing at least some of the magnesium oxide following the reaction by acid etching.

In one preferred aspect of the method, the valve metal is selected from the group consisting of tantalum, niobium, an alloy of tantalum, an alloy of niobium, hafnium, titanium and aluminum.

In another preferred aspect of the method, the filaments or fibers have a thickness of less than about 5-10 microns, and preferably a thickness below about 1 micron.

In another aspect of the method, the electrochemically active material comprises silicon nanoparticles.

The present invention also provides a lithium ion battery comprising a case containing an anode and a cathode separated from one another, and an electrolyte, wherein the anode is formed of electrically active electrode material comprising the steps of: (a) providing valve metal substrate material formed of filaments or particles of a valve metal not larger than about 10 microns in cross section; and, (b) coating the valve metal substrate material with metallurgically bonded silicon formed by a magnesiothermic reaction of magnesium with silicon and the valve metal.

In yet another aspect of the cell, the valve metal is selected from the group consisting of tantalum, niobium, an alloy of tantalum, an alloy of niobium, hafnium, titanium and aluminum.

SUMMARY OF THE INVENTION

The present invention provides a combination reaction (or co-reaction) of Mg de-oxidation of a refractory metal substrate and substantially simultaneous reduction of $SiO_2$ (silica) to produce nanoscale coating of nanostructured Si inside a stabilizing MgO coating, both of which are metallurgically bonded to a valve metal substrate. The oxide impurities in the valve metal and the $SiO_2$ react substantially concurrently to form a nanoscale nanostructure of pure Si which is firmly bonded to the valve metal substrate, e.g. tantalum (Ta) via the reaction:

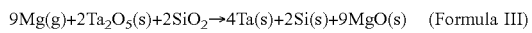
$9Mg(g)+2Ta_2O_5(s)+2SiO_2 \rightarrow 4Ta(s)+2Si(s)+9MgO(s)$ (Formula III)

The overall process involves mixing valve metal particles, e.g., tantalum, with $SiO_2$ nanoparticles of 4 to 200 micron size, preferably 10 to 100 micron size, more preferably 20 to 50 micron size in an aqueous based solution or gel. In one method, $SiO_2$ particles are impregnated into a preformed, porous mat of tantalum fibers as an aqueous gel of $SiO_2$ nanoparticles. In another method, loose particles of tantalum are mixed with $SiO_2$ particles. The resulting mixture is then subjected to a magnesiothermic reduction via Formula III under vacuum or inert gas at temperatures between 900-1100° C. for 2 to 10 hrs. The magnesium reduces the silica and the oxide impurities within the tantalum fiber thereby permitting the silicon to metallurgically bond to the tantalum substrate. The magnesium oxide which results may remain, or be removed for example, by acid etching. The resulting structure is a spongy, high surface area conductive, electrochemically stable refractory metal substrate coated with a composite of sub-micron Si particles within a MgO coating.

BRIEF DESCRIPTION OF THE DRAWINGS

Further features and advantages of the present invention will be seen from the following detailed description, taken in conjunction with the accompanying drawings, wherein.

DETAILED DESCRIPTION OF THE INVENTION

In one embodiment of the invention, the refractory metal is formed of micron size (e.g. not larger than about 10 microns in across) tantalum filaments formed as described for example, in my earlier U.S. Pat. Nos. 9,155,605, 5,869, 196, 7,146,709, and PCT WO2016/187143 A1, the contents of which are incorporated herein by reference.

Figure 1:
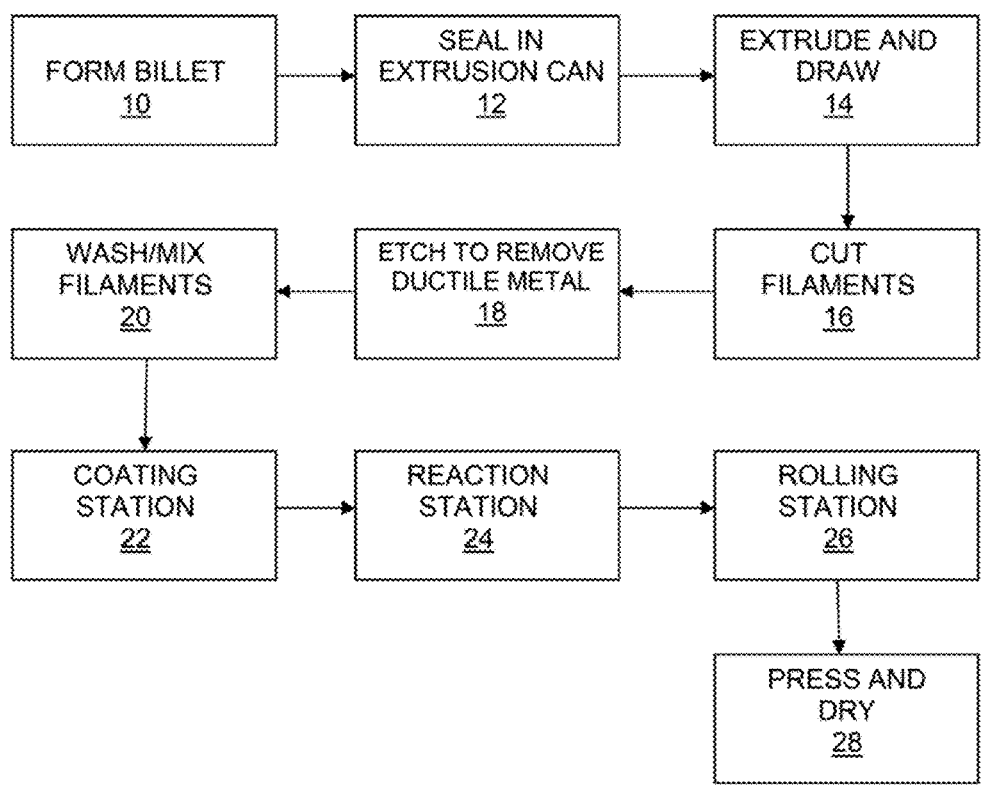
FIG. 1 is a schematic block diagram of a process for providing anode material in accordance with the present invention.

Referring to FIG. 1, the production process starts with the fabrication of valve metal filaments, preferably tantalum, by combining filaments or wires of tantalum with a ductile material, such as copper to form a billet at step 10. The billet is then sealed in an extrusion can in step 12, and extruded and drawn in step 14 following the teachings of my '196 U.S. patent. The extruded and drawn filaments are then cut or chopped into short segments, typically ⅟₁₆th-¼th inch long at a chopping station 16. Preferably the cut filaments all have approximately the same length. Actually, the more uniform the filament, the better. The chopped filaments are then passed to an etching station 18 where the ductile metal is leached away using a suitable acid. For example, where copper is the ductile metal, the etchant may comprise nitric acid.

Etching in acid removes the copper from between the tantalum filaments.

After etching, one is left with a plurality of short filaments of tantalum. The tantalum filaments are then washed in water in a washing station 20, and the wash water is partially decanted to leave a slurry of tantalum filaments in water. The slurry of tantalum particles in water is then mixed with fine, e.g. 4 to 200 micron size silica particles in water, in a coating station 22, forming a spongy mass. The coated spongy mass is then dried and subjected to magnesiothermic reaction by treating under vacuum or in an inert gas at 800 to 1200° C., preferably 900 to 1100° C., more preferably 950 to 1050° C., for 2 to 10 hours, preferably 4 to 8 hours, more preferably 5 to 6 hours at a reaction station 24. The magnesium reduces the silica and the oxide impurities within the tantalum fibers simultaneously permitting silicon to metallurgically bond to the tantalum fibers. Any magnesium oxide which results may remain, but preferably is removed for example by acid etching. On the other hand, it is not necessary to completely remove any copper which may be left over from the extrusion and drawings steps, since the copper also would metallurgically bond to the silicon. The resulting structure is a spongy, high surface area, conductive electrochemically stable tantalum metal substrate mass coated with a composite of sub-micron Si particles coated with a MgO matrix. The resulting spongy mass may then be mixed with water, and cast as a mat at a rolling station 26. The resulting mat is then further compressed and dried at a drying station 28.

As an alternative to coating and rolling a thin sheet may be formed by spray casting the slurry onto to a substrate, excess water removed and the resulting mat pressed and dried as before.

There results a highly porous thin sheet of Si/MgO composite or Si coated tantalum filaments substantially uniform in thickness.

As reported in my aforesaid PCT application, an aqueous slurry of chopped filaments will adhere together sufficiently so that the fibers may be cast as a sheet which can be pressed and dried into a stable mat. This is surprising in that the metal filaments themselves do not absorb water. Notwithstanding, as long as the filaments are not substantially thicker than about 10 microns, they will adhere together. On the other hand, if the filaments are much larger than about 10 microns, they will not form a stable mat or sheet. Thus, it is preferred that the filaments have a thickness of less than about 10 microns, and preferably below 1 micron thick. To ensure an even distribution of the filaments, and thus ensure production of a uniform mat. the slurry preferably is subjected to vigorous mixing by mechanical stirring or vibration.

The density or porosity of the resulting tantalum mat may be varied simply by changing the final thickness of the mat.

Also, if desired, multiple layers may be stacked to form thicker mats that may be desired, for example, for high density applications.

The resulting tantalum mat comprises a porous mat of sub-micron size Si or Si/MgO composite coated tantalum filaments in contact with one another, forming a conductive mat.

Alternatively, in a preferred embodiment of the invention, the raw tantalum filaments may be formed as mats of electrode material by casting and rolling above described are then coated with silicon nanoparticles by magnesiothermic reduction as above described, e.g., by dipping the tantalum mat into an aqueous based solution containing fine silica in water, and then heating under vacuum or inert gas as above described.

Figure 2:
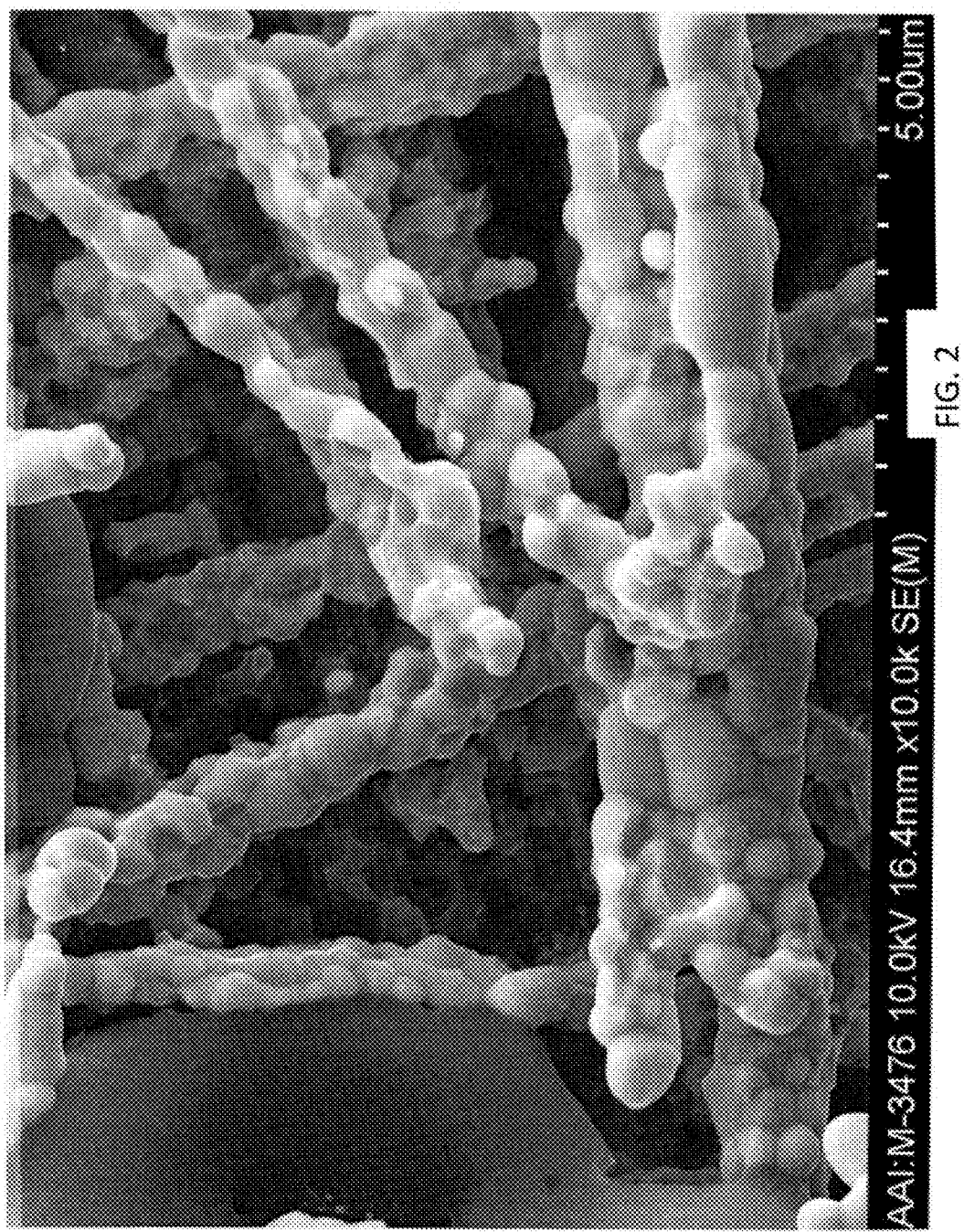
FIGS. 2 and 3 are SEM photographs at two different magnifications showing nanoscaled nanostructure of Si particles metallurgically bonded to Ta support particles in accordance with the present invention.
Figure 3:
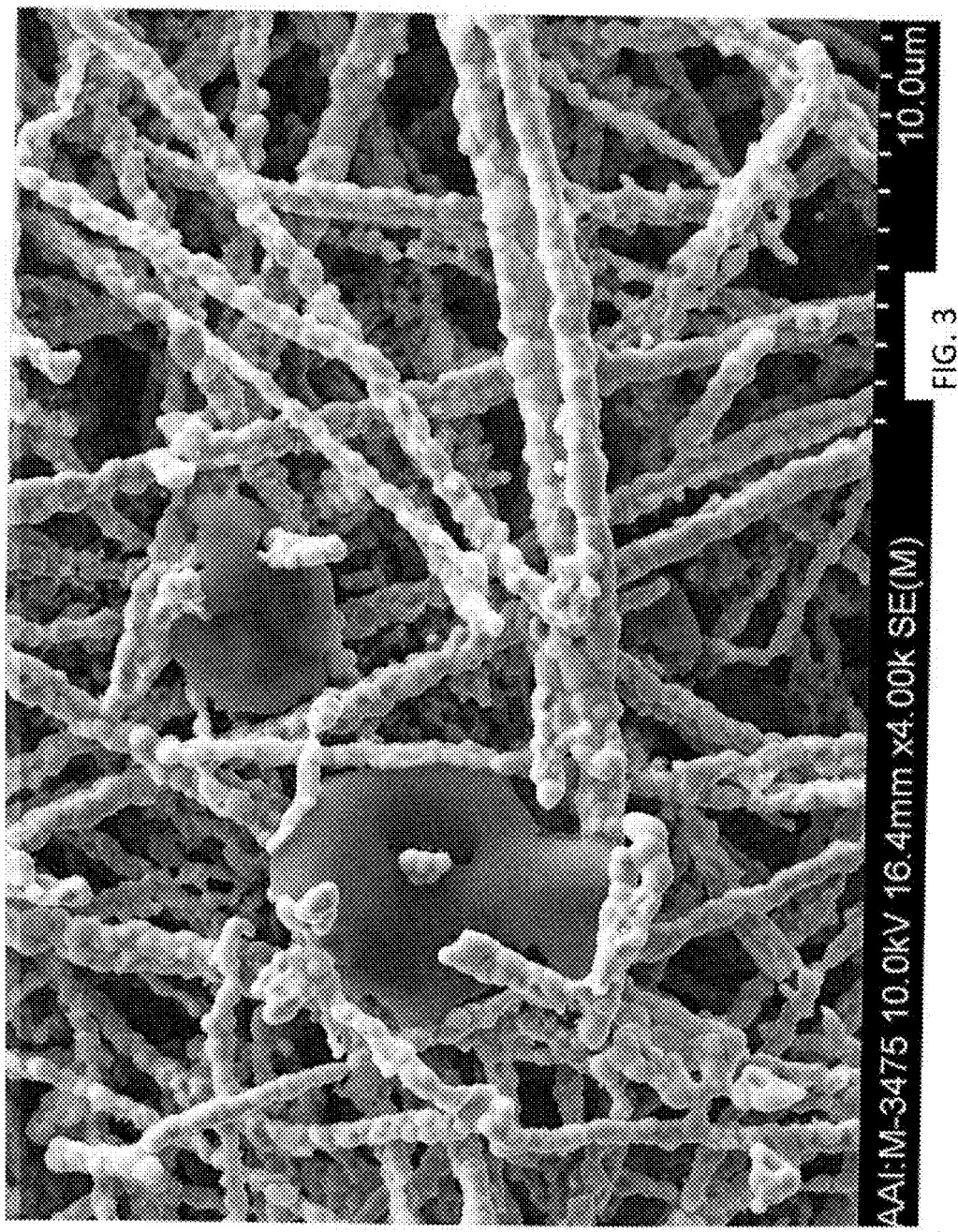

The Si/Ta structure as shown in FIGS. 2 and 3 is that of valve metal structure that is coated with a layer of nanoscaled nanostructure Si particles. The MgO can act as a stabilizing buffer against the degradation of the Si during cycling as the LIB anode. Although it is preferred that the MgO matrix is removed, using mineral acids, to reveal a nanoscaled nanostructure of the Si particles which are metallurgically bonded to the Ta support particles.

Figure 4:
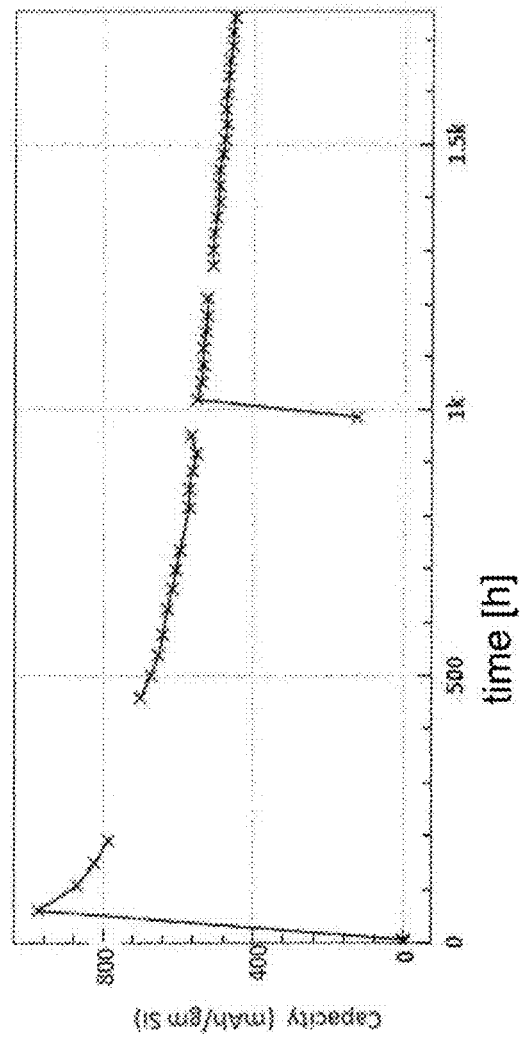
FIG. 4 plots capacity versus time of anode material made in accordance with the present invention.
Figure 5:
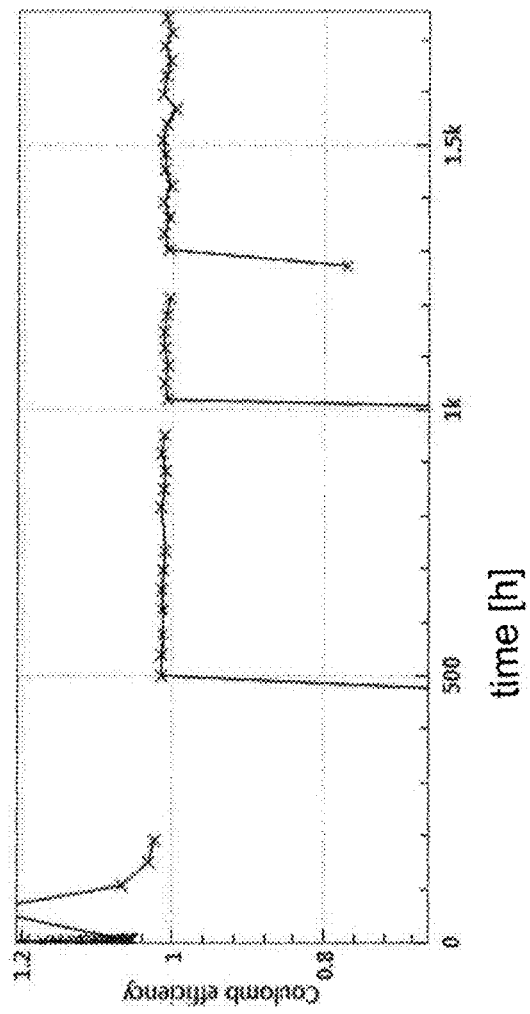
FIG. 5 plots coulomb efficiency versus time of anode material made in accordance with the present invention.
Figure 6:
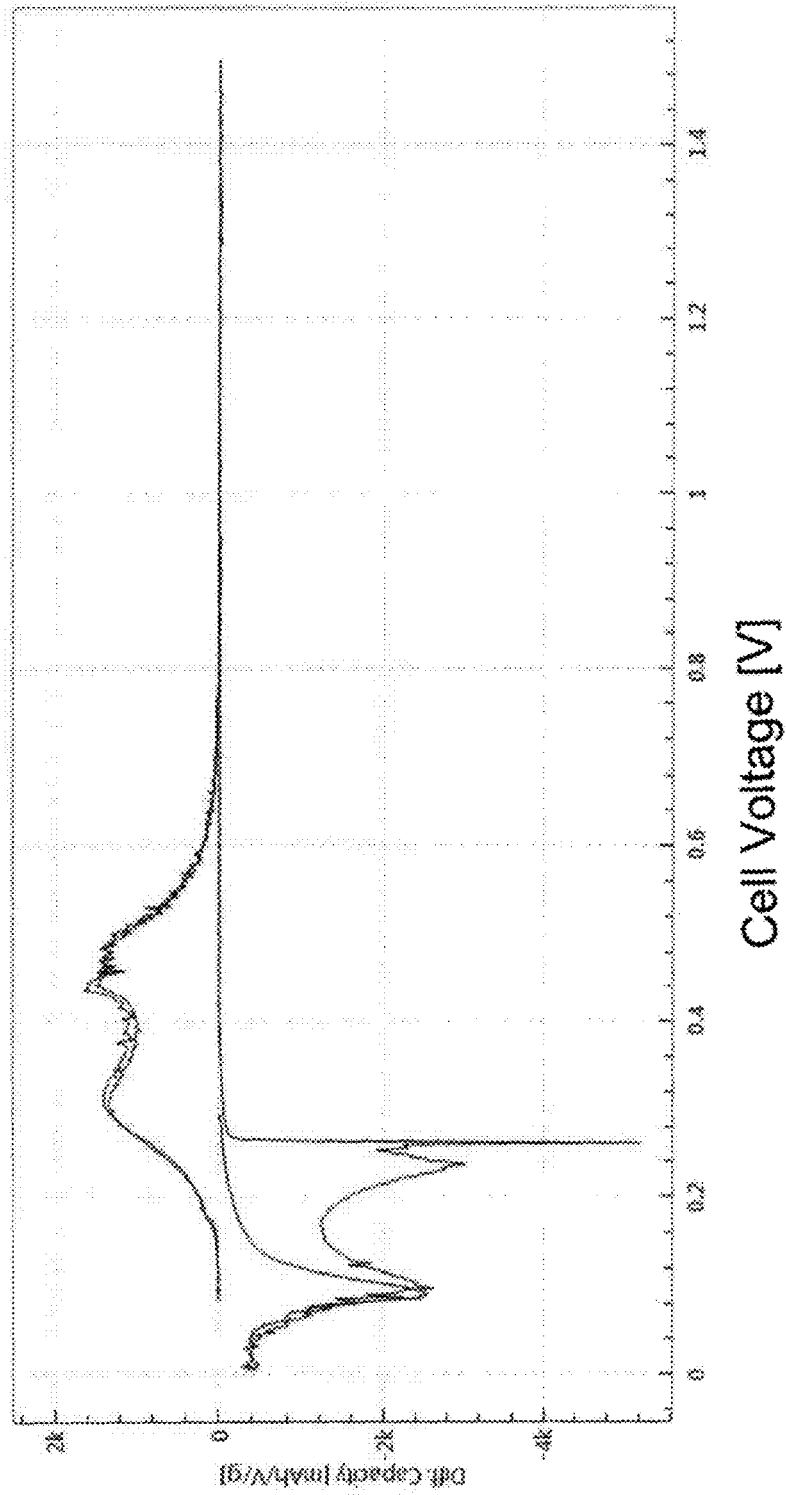
FIG. 6 plots differential capacity versus cell voltage for a lithium ion battery anode made in accordance with the present invention.

The resulting materials are tested for capacity over time, coulomb efficiency over time and differential capacity over cell voltage, and the results shown in FIGS. 4-6.

Figure 7:
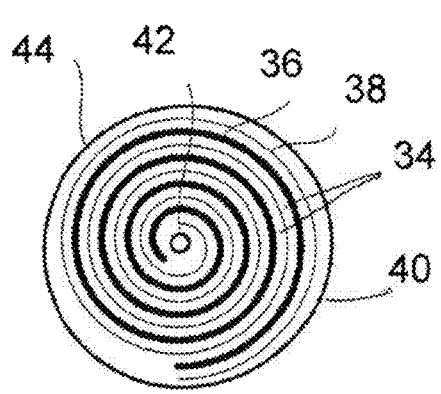
FIG. 7 is a cross-sectional view of a rechargeable battery in accordance with the present invention.
Figure 8:
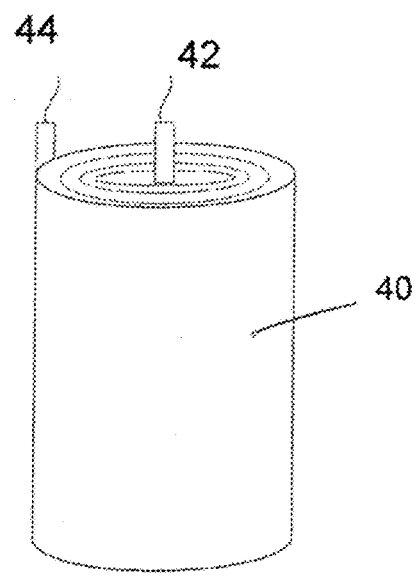
FIG. 8 is a perspective view of a battery made in accordance with the present invention.

The resulting Si coated refractory material can be formed into useful LIB anodes via any standard manufacturing method, including, but not limited to: thin wet-lay methods deposited on a current collector, with or without conductive carbon additive; calendared fabrics; coins; etc. For example, referring to FIGS. 7 and 8, the coated mats are then assembled in a stack between separator sheets 36 to form positive (anode) and negative (cathode) electrodes 38, 40. The electrodes 38, 40 and separator sheets 36 are wound together in a jelly roll and inserted in the case 42 with a positive tab 44 and a negative tab 46 extending from the jelly roll in an assembly station 48. The tabs can then be welded to exposed portions of the electrode substrates, and the case filled with electrolyte and the case sealed. The result is a high capacity rechargeable battery in which the electrode material comprises extremely ductile fine metal composite filaments capable of repeated charging and draining without adverse effects. Other methods are also contemplated.

Various changes may be made in the above invention without departing from the spirit and scope thereof. For example, the invention has been described particularly in connection with silicon, other materials such as germanium advantageously may be employed. Still other changes may be made without departing from the spirit and scope of the invention.

The invention claimed is:

1. An electrically active electrode material for use with a lithium ion cell, the electrochemically active electrode material comprising a substrate material consisting of individual filaments of a valve metal selected from the group consisting of tantalum, niobium, an alloy of tantalum, an alloy of niobium, hafnium, titanium and aluminum, not larger than about 10 microns across, which filaments are adhered together to form a mat or porous sheet and wherein the individual filaments of the mat or porous sheet are coated with a coating of crystalline silicon inside a stabilizing magnesium oxide coating, wherein the silicon is metallurgically bonded to the valve metal filaments.

2. The electrically active electrode material of claim 1, wherein the valve metal filaments have a thickness of less than 10 microns.

3. The electrically active electrode material of claim 1, wherein the valve metal filaments have a thickness below about 1 micron.

4. The electrically active electrode material of claim 1, formed into an anode.

5. A method of forming an electrode substrate useful for forming a lithium ion battery comprising the steps of:
(a) providing valve metal substrate material formed of individual filaments of a valve metal selected from the group consisting of tantalum, niobium, an alloy of tantalum, an alloy of niobium, hafnium, titanium and aluminum, not larger than about 10 microns across;
(b) forming the individual filaments of step (a) into a mat or porous sheet; and
(c) subjecting the mat or porous sheet of step (b) and silica to a simultaneous magnesiothermic co-reaction with magnesium to produce a coating of crystalline silicon inside a stabilizing magnesium oxide coating, wherein the silicon coating is metallurgically bonded to the individual valve metal filaments.

6. The method of claim 5, wherein the magnesiothermic co-reaction is conducted under vacuum or in an inert gas at elevated temperature of 800-1200° C.

7. The method of claim 6, wherein the elevated temperature is 900-1100° C.

8. The method of claim 6, wherein the magnesiothermic co-reaction is conducted for 2-10 hours.

9. The method of claim 5, wherein the filaments have at thickness of less than 10 microns.

10. The method of claim 5, wherein the filaments have a thickness below about 1 micron.

11. A lithium ion battery comprising a case containing an anode and a cathode separated from one another, and an electrolyte, wherein the anode is formed of electrically active electrode material as claimed in claim 1.

12. The method of claim 6, wherein the elevated temperature is 950-1050° C.

13. The method of claim 6, wherein the magnesiothermic co-reaction is conducted for 4-8 hours.

14. The method of claim 6, wherein the magnesiotheimic co-reaction is conducted for 5-6 hours.

15. The electrically active electrode material of claim 1, wherein the valve metal filaments have a thickness of less than 5 microns.

16. The method of claim 5, wherein the filaments have a thickness of less than 5 microns.

* * * * *